(12) United States Patent
Tsai et al.

(10) Patent No.: US 7,897,278 B2
(45) Date of Patent: Mar. 1, 2011

(54) BATTERY MODULE FOR POWER HAND TOOL

(75) Inventors: Kim Y. C. Tsai, Taichung Hsien (TW); Cheng-I Teng, Taichung County (TW)

(73) Assignee: Mobiletron Electronics Co., Ltd., Taichung Hsien (TW)

( * ) Notice: Subject to any disclaimer, the term of this patent is extended or adjusted under 35 U.S.C. 154(b) by 958 days.

(21) Appl. No.: 11/798,662

(22) Filed: May 16, 2007

(65) Prior Publication Data
US 2008/0171262 A1 Jul. 17, 2008

(51) Int. Cl.
*H01M 10/38* (2006.01)
*H01M 2/10* (2006.01)

(52) U.S. Cl. ............. 429/123; 429/97; 429/99; 429/100; 429/177; 320/107; 320/112

(58) Field of Classification Search ........ 429/1, 96–100, 429/123, 163, 176, 177; 320/106, 107, 110, 320/112, 113, 114, 115, 111; 439/500; 30/DIG. 1
See application file for complete search history.

(56) References Cited

U.S. PATENT DOCUMENTS
6,805,997 B1 * 10/2004 Katayama ............ 429/123
7,659,693 B2 * 2/2010 Hensel et al. ......... 320/112
2003/0090234 A1 * 5/2003 Glasgow et al. ....... 320/107

FOREIGN PATENT DOCUMENTS
JP 2006127777 A * 5/2006

* cited by examiner

Primary Examiner — Dah-Wei D Yuan
Assistant Examiner — Edu E Enin-Okut
(74) Attorney, Agent, or Firm — Bacon & Thomas, PLLC

(57) ABSTRACT

A battery module includes a top cover and a bottom cover affixed together to accommodate a battery set, which has conducting terminals positioned in respective bottom side holes of the bottom cover for the contact of respective metal contacts of a battery charger or power hand tool. A movable member is sleeved onto the battery set inside the bottom cover and held in a first position by spring members to block side holes of the bottom cover and movable from the first position to a second position to open the side holes of the bottom cover for ventilation to dissipate heat upon insertion of the battery module in a battery charger for charging.

4 Claims, 3 Drawing Sheets

BATTERY MODULE FOR POWER HAND TOOL

BACKGROUND OF THE INVENTION

1. Field of the Invention

The present invention relates generally to accessories for power hand tool, and more particularly to a battery module for a power hand tool.

2. Description of the Related Art

The battery of a regular power hand tool needs to have a high electricity storage capacity to supply long life power to the power hand tool. Therefore, Li-ion battery is the main choice for power hand tools.

A Li-ion battery has a high electricity storage capacity, however it generates much heat energy during charging, thereby increasing the temperature. There are battery chargers that have heat dissipation means to dissipate heat when charging a battery. However, the heat dissipation means simply dissipates heat from the battery charger, having no significant effect in lowering the temperature of the battery, and the battery under charging may burn out due to excessively high temperature.

SUMMARY OF THE INVENTION

The present invention has been accomplished under the circumstances in view. It is therefore one objective of the present invention to provide a battery module, which obtains a better heat dissipation effect.

To achieve this objective of the present invention, the battery module comprises a top cover and a bottom cover affixed together to accommodate a battery set, which has conducting terminals positioned in respective bottom side holes of the bottom cover for the contact of respective metal contacts of a battery charger or power hand tool. A movable member is sleeved onto the battery set inside the bottom cover and held in a first position by spring members to block side holes of the bottom cover and movable from the first position to a second position to open the side holes of the bottom cover for ventilation to dissipate heat upon insertion of the battery module in a battery charger for charging.

In a preferred embodiment, the top cover includes a chamber and a plurality of recessed holes. The bottom cover includes a chamber disposed in communication with the chamber of the top cover to form an enclosed receiving space. The bottom cover has a plurality of top through holes spaced around the chamber of the bottom cover, a plurality of bottom through holes in communication between the chamber of the bottom cover and the space outside the bottom cover, a plurality of first side holes in communication between the chamber of the bottom cover and the space outside the bottom cover near a top side of the bottom cover, and a plurality of second side holes in communication between the chamber of the bottom cover and the space outside the bottom cover near a bottom side of the bottom cover. A shutter is mounted in the enclosed receiving space around the battery set. The shutter has a movable member and a plurality of spring members. The movable member has a plurality of bottom pins respectively inserted through the top through holes of the bottom cover for stopping against an external object to move the movable member relative to the bottom cover, a plurality of recessed holes at a top side thereof corresponding to the recessed holes of the top cover, and a plurality of through holes corresponding to the first side holes of the bottom cover. The spring members are respectively connected between the recessed holes of the top cover and the recessed holes of the movable member. When the bottom pins receive no external pressure, the spring members support the movable member in the enclosed receiving space in a first position where the through holes of the movable member are not in communication with the first side holes of the bottom cover and the periphery of the movable member blocks the first side holes of the bottom cover; when the bottom pins are stopped against an external object to move the movable member relative to the bottom cover, the spring members are compressed and the through holes of the movable member are forced into communication with the first side holes of the bottom cover for ventilation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
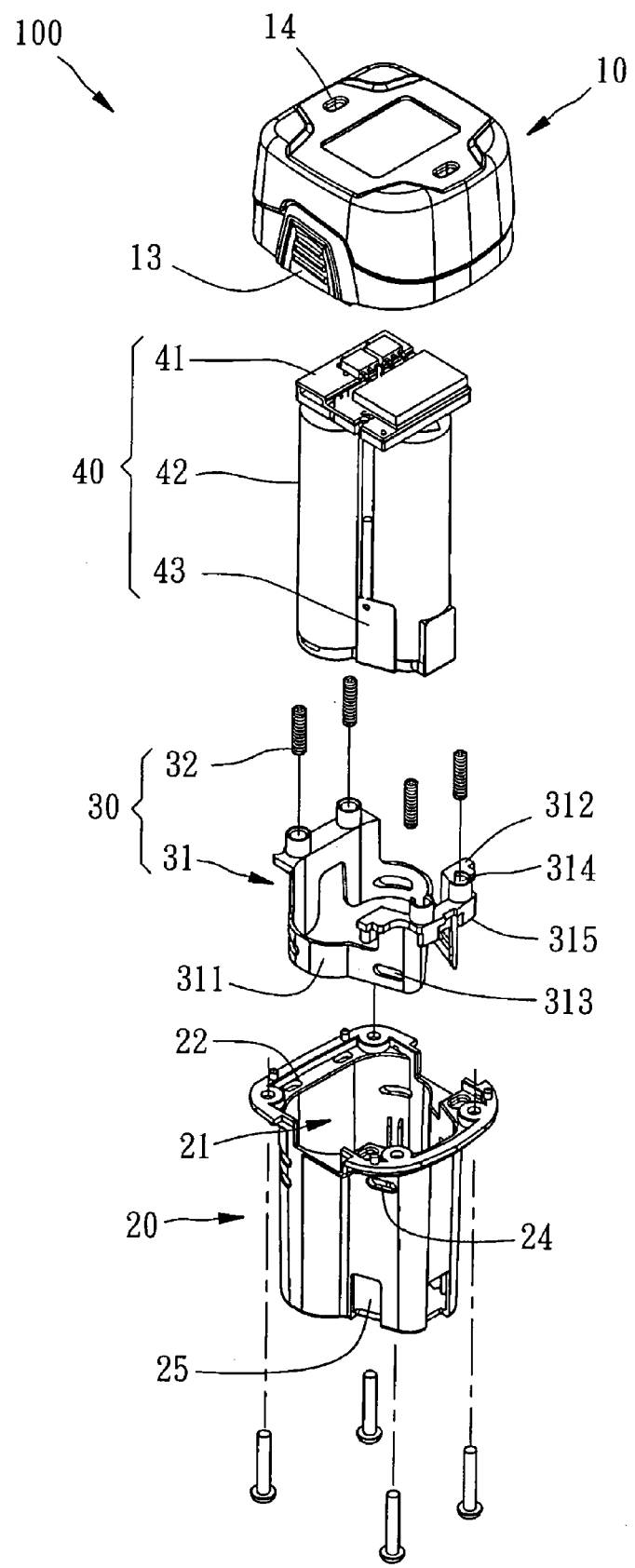
FIG. 1 is an exploded view of a battery module in accordance with a preferred embodiment of the present invention.
Figure 2:
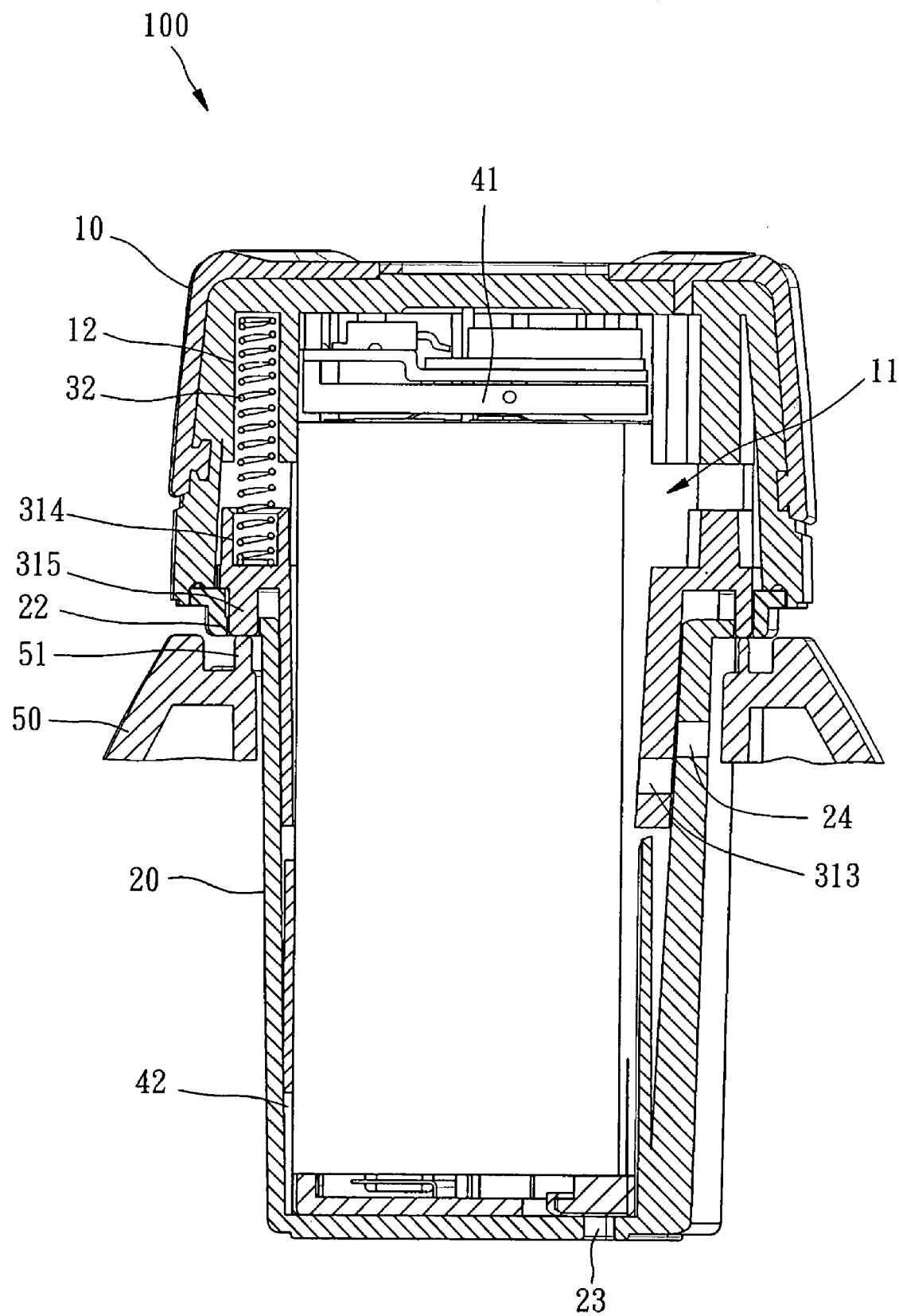
FIG. 2 is a sectional side view of the present invention, showing the status of the battery module before charging.
Figure 3:
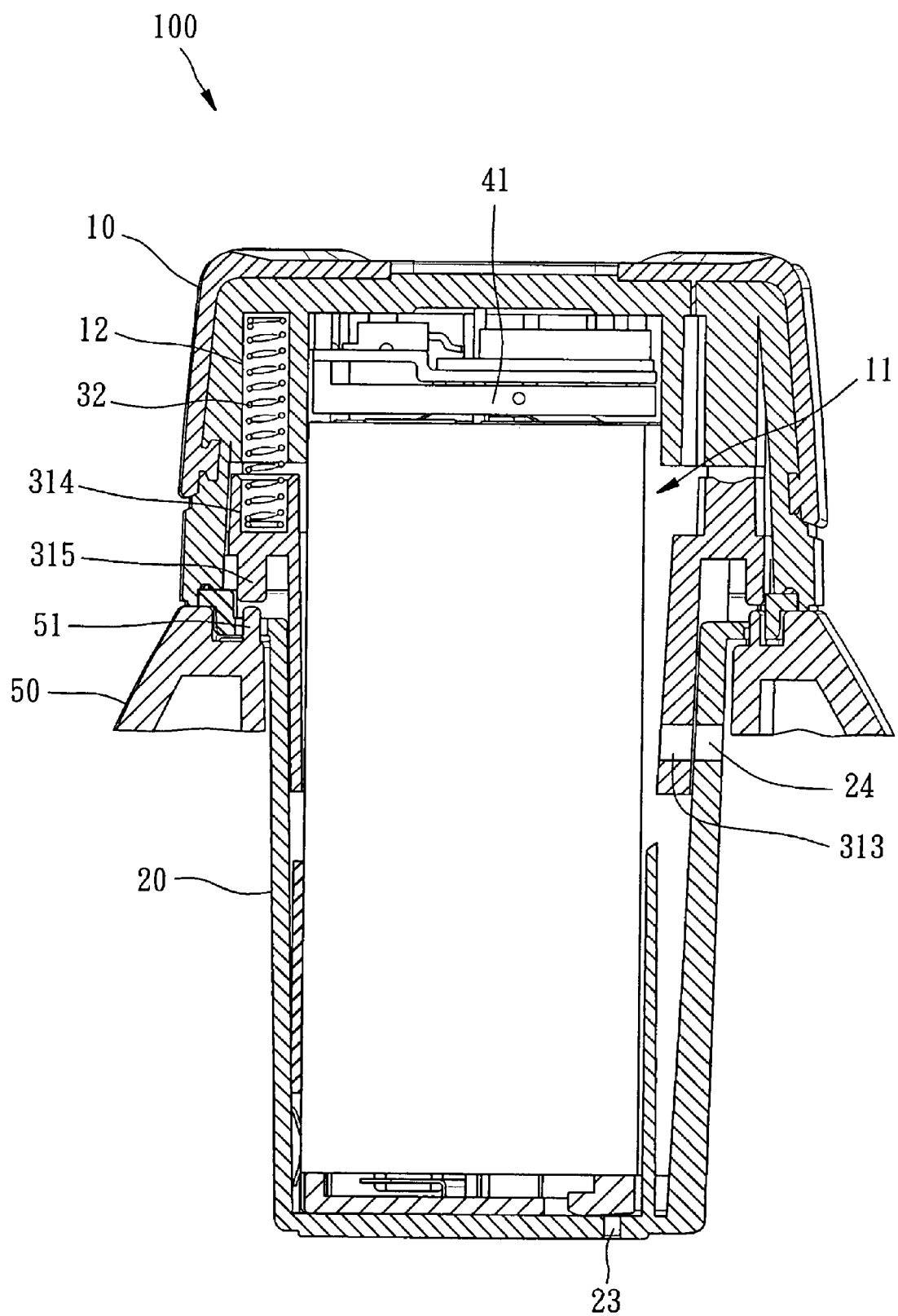
FIG. 3 corresponds to FIG. 2, showing the charging status of the battery module.

As shown in FIGS. 1-3, a battery module 100 in accordance with a preferred embodiment of the present invention comprises a top cover 10, a bottom cover 20, a shutter 30, a battery set 40.

The top cover 10 defines therein a chamber 11 and a plurality of recessed holes 12. Further, the top cover 10 has two elastic retaining members 13 symmetrically disposed at two opposite lateral sides for securing to a battery charger or power hand tool (not shown), and a plurality of top through holes 14 in communication with the chamber 11 and the outside space.

The bottom cover 20 defines therein a chamber 21, a plurality of top through holes 22 spaced around the chamber 21, a plurality of bottom through holes 23 in communication between the chamber 21 and the outside space, a plurality of first side holes 24 in communication between the chamber 21 and the outside space near the top side of the chamber 21, and a plurality of second side holes 25 in communication between the chamber 21 and the outside space near the bottom side of the chamber 21.

The shutter 30 includes a movable member 31 and a plurality of spring members 32. The movable member 31 has a body 311 and an extension 312. The body 311 of the movable member 31 is an annular member of a predetermined configuration, having a plurality of through holes 313 in communication between the inside of the body 311 and the outside of the body 311 corresponding to the first side holes 24 of the bottom cover 20. The extension 312 extends outwards from the top side of the body 311, having a plurality of recessed holes 314 at the top side corresponding to the recessed holes 12 of the top cover 10 and a plurality of pins 315 at the bottom side corresponding to the top through holes 22 of the bottom cover 20. The spring members 32 are compression springs.

The battery set 40 comprises a control circuit board 41, a plurality of energy storage capacitors 42, and a plurality of conducting terminals 43. The control circuit board 41 is provided at the top side of the energy storage capacitors 42 and electrically connected to the energy storage capacitors 42. The conducting terminals 43 are provided at the bottom side of the energy storage capacitors 42 at locations corresponding to the second side holes 25 of the bottom cover 20, and electrically connected to the energy storage capacitors 42 and the control circuit board 41.

After introduction of the component parts of the battery module 100, the assembly procedure and features of the battery module 100 are outlined hereinafter.

At first, the spring members 32 are respectively inserted with the respective first ends into the recessed holes 12 of the top cover 10, and then the movable member 31 is inserted into the chamber 11 of the top cover 10 to have the respective second ends of the spring members 32 be respectively engaged into the recessed holes 314 of the extension 312 of the movable member 31, and then the battery set 40 is inserted into the movable member 31, and then the bottom side of the top cover 10 is fixedly fastened to the top side of the bottom cover 20 to have the chamber 11 of the top cover 10 and the chamber 21 of the bottom cover 20 form an enclosed receiving space, the pins 315 of the movable member 31 be respectively engaged into the top through holes 22 of the bottom cover 20, and the conducting terminals 43 of the battery set 40 be respectively positioned in the second side holes 25 of the bottom cover 20 for the contact of the respective metal contacts of a battery charger or power hand tool so that electricity can be inputted from the battery charger through the conducting terminals 43 into the energy storage capacitors 42 or outputted from the energy storage capacitors 42 through the conducting terminals 43 into the power hand tool. When the battery module 100 is assembled, the through holes 313 of the body 311 of the movable member 31 are spaced from the first side holes 24 of the bottom cover 20 and not in communication with the first side holes 24 of the bottom cover 20 (see FIG. 2).

When wishing to charge the battery module 100 with a battery charger 50, insert the bottom cover 20 of the battery module 100 into the insertion hole of the battery charger 50 to force the conducting terminals 43 into contact with the respective metal contacts (not shown) in the insertion hole of the battery charger 50 for enabling electricity be inputted through the conducting terminals 43 into the energy storage capacitors 42 to charge the energy storage capacitors 42.

When inserting the battery module 100 into the insertion hole of the battery charger 50, the pins 315 of the movable member 31 are respectively stopped against a respective protruding block 51 in insertion hole of the battery charger 50 to compress the spring members 32, and therefore the movable member 31 is moved relative to the bottom cover 20 from a first position where the through holes 313 of the body 311 of the movable member 31 are not in communication with the first side holes 24 of the bottom cover 20 (see FIG. 2) to a second position where the through holes 313 of the body 311 of the movable member 31 are in communication with the first side holes 24 of the bottom cover 20 respectively (see FIG. 3). After the movable member 31 reached the second position, the through holes 313 of the body 311 of the movable member 31 are in communication with the first side holes 24 of the bottom cover 20 for ventilation so that thermal energy can be carried out of the battery set 40 to the outside of the bottom cover 20 to lower the temperature of the battery set 40 when charging the energy storage capacitors 42.

After charging, the battery module 100 is removed from the battery charger 50. After removal of the battery module 100 from the battery charger 50, the pins 315 of the movable member 31 receive no pressure, and the spring members 32 return the movable member 31 from the second position to the first position. At this time, the through holes 313 of the body 311 of the movable member 31 are not in communication with the first side holes 24 of the bottom cover 20, and the peripheral wall of the movable member 31 blocks the first side holes 24 of the bottom cover 20 against outside dust or external bodies.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A battery module comprising:
a top cover having a chamber and a plurality of recessed holes;
a bottom cover fixedly fastened to a bottom side of said top cover, said bottom cover having a chamber disposed in communication with the chamber of said top cover to form an enclosed receiving space, a plurality of top through holes spaced around the chamber of said bottom cover, a plurality of bottom through holes in communication between the chamber of said bottom cover and the space outside said bottom cover, a plurality of first side holes in communication between the chamber of said bottom cover and the space outside said bottom cover near a top side of said bottom cover, and a plurality of second side holes in communication between the chamber of said bottom cover and the space outside said bottom cover near a bottom side of said bottom cover;
a battery set mounted in said enclosed receiving space, said battery set having a plurality of conducting terminals respectively positioned in the second side holes of said bottom cover for the contact of respective metal contacts of an external electronic device; and
a shutter mounted in said enclosed receiving space, said shutter having a movable member and a plurality of spring members, said movable member having a plurality of bottom pins respectively inserted through the top through holes of said bottom cover for stopping against an external object to move said movable member relative to said bottom cover, a plurality of recessed holes at a top side thereof corresponding to the recessed holes of said top cover, and a plurality of through holes corresponding to the first side holes of said bottom cover, said spring members being respectively connected between the recessed holes of said top cover and the recessed holes of said movable member;
wherein when said bottom pins receive no external pressure, said spring members support said movable member in said enclosed receiving space in a first position where the through holes of said movable member are not in communication with the first side holes of said bottom cover and the periphery of said movable member blocks the first side holes of said bottom cover; when said bottom pins are stopped against an external object to move said movable member relative to said bottom cover, said spring members are compressed and the through holes of said movable member are forced into communication with the first side holes of said bottom cover for ventilation.

2. The battery module as claimed in claim 1, wherein said top cover comprises two elastic retaining members symmetrically disposed at two opposite lateral sides for securing to an external electronic device.

3. The battery module as claimed in claim 1, wherein said movable member comprises a body sleeved onto said battery set, and an extension extended from said body; the through holes of said movable member are formed in the periphery of said body; the recessed holes of said movable member are formed in a top side of said extension; the bottom pins of said movable member are respectively extending from a bottom side of said extension.

4. The battery module as claimed in claim 1, wherein said top cover comprises a plurality of through holes in communication between the chamber of said top cover and the space outside said top cover.

* * * * *